(12) United States Patent
Wang et al.

(10) Patent No.: US 8,170,288 B2
(45) Date of Patent: May 1, 2012

(54) REDUCING NOISE IN 3D SEISMIC DATA WHILE PRESERVING STRUCTURAL DETAILS

(75) Inventors: Yuchun Eugene Wang, Dhahran (SA); Saleh Al-Dossary, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 383 days.

(21) Appl. No.: 12/454,091

(22) Filed: May 11, 2009

(65) Prior Publication Data
US 2010/0284573 A1  Nov. 11, 2010

(51) Int. Cl.
*G06K 9/00* (2006.01)
(52) U.S. Cl. ....................................... 382/109
(58) Field of Classification Search .................... 382/109
See application file for complete search history.

(56) References Cited

U.S. PATENT DOCUMENTS

| | | | |
|---|---|---|---|
| 5,038,378 A | 8/1991 | Chen | |
| 6,038,031 A | 3/2000 | Murphy | |
| 6,115,022 A | 9/2000 | Mayer, III et al. | |
| 6,473,697 B2 | 10/2002 | Bouts et al. | |
| 6,636,618 B1 | 10/2003 | Keskes et al. | |
| 6,725,174 B2 | 4/2004 | Bouts et al. | |
| 6,757,615 B2 | 6/2004 | Zauderer et al. | |
| 6,993,204 B1 | 1/2006 | Yahil et al. | |
| 7,136,079 B2 | 11/2006 | Luo et al. | |
| 7,203,342 B2 * | 4/2007 | Pedersen | 382/109 |
| 7,254,091 B1 | 8/2007 | Gunning et al. | |
| 7,295,930 B2 | 11/2007 | Dulac et al. | |
| 2003/0030635 A1 | 2/2003 | Meinzer et al. | |
| 2004/0145591 A1 | 7/2004 | Luo et al. | |
| 2005/0052452 A1 | 3/2005 | Baumberg | |
| 2006/0235620 A1 | 10/2006 | Lecerf | |
| 2007/0005312 A1 | 1/2007 | Bateman | |
| 2007/0024614 A1 | 2/2007 | Tam et al. | |
| 2007/0168169 A1 | 7/2007 | Neave | |
| 2007/0192058 A1 | 8/2007 | Ishibashi et al. | |
| 2007/0206025 A1 | 9/2007 | Oka | |
| 2007/0291588 A1 | 12/2007 | Banik | |
| 2007/0299614 A1 | 12/2007 | Dewarrat | |
| 2008/0019603 A1 | 1/2008 | Rahmes et al. | |
| 2009/0122061 A1 * | 5/2009 | Hammon, III | 345/424 |

OTHER PUBLICATIONS

Kuge, K. et al (1994), "Systematic non-double-couple components of earthquake mechanisms: The role of fault zone irregularity," J. Geophys. Res., 99(B8), 15457-15467.
Luo et al. (2002), "Edge-preserving smoothing and applications," The Leading Edge, vol. 21, Iss. 2., pp. 136-141, 158.
PCT/US10/33818 ISR and Written Opinion, dated Jul. 7, 2010, pp. 1-6.

(Continued)

*Primary Examiner* — Tom Y Lu
(74) *Attorney, Agent, or Firm* — Abelman, Frayne & Schwab (57) ABSTRACT

A system and method perform structure-preserving smoothing (SPS) using a data adaptive method for smoothing 3D post-stacked seismic attributes which reduces random noise while preserving the structure without prior computation of its orientation. The data is smoothed within a neighborhood sub-window along a set of predefined orientations, and the best smoothing result is then selected for output. The orientation corresponding to the best result often approximates the true structure orientation embedded in the data, so that the embedded structure is thus preserved. The SPS method can also be combined with median, alpha-trim, symmetric near neighbor, or edge-preserving filters. The SPS method is an effective way to reduce random noise and eliminate noise footprints, and to enhance coherence and curvature attributes.

5 Claims, 7 Drawing Sheets

OTHER PUBLICATIONS

Hall, Matt, "Smooth operator: Smoothing seismic interpretations and attributes," The Leading Edge, Interpreter's Corner, Jan. 2007, pp. 16-20.
Albinhassan et al., "3D edge-preserving smoothing and applications," Geophysics, vol. 71, No. 4, Jul.-Aug. 2006, pp. P5-P11.
Fehmers et al., "Fast structural interpretation with structure-oriented filtering," Geophysics, vol. 68, No. 4, Jul.-Aug. 2003, pp. 1286-129.
Luo et al., "Edge-preserving smoothing and applications," The Leading Edge, Acquisition Processing, Feb. 2002, pp. 136-?.
Bahorich et al., "3-D seismic discontinuity for faults and stratigraphic features: The coherence cube," The Leading Edge, Oct. 1995, pp. 1053-1058.
Al-Dossary et al., "3D volumetric multispectral estimates of reflector curvature and rotation," Geophysics, vol. 71, No. 5, Sep.-Oct. 2006, pp. P41-P51.
Bakker, Peter, "Image structure analysis for seismic interpretation," ASCI (Advanced School for Computing and Imaging) dissertation series No. 78, 2002.

* cited by examiner

REDUCING NOISE IN 3D SEISMIC DATA WHILE PRESERVING STRUCTURAL DETAILS

FIELD OF THE INVENTION

This invention relates to the processing of seismic data, and in particular to a system and method for smoothing seismic data while preserving structural information.

BACKGROUND OF THE INVENTION

As referred to herein, the term "structure" includes a planar feature in three-dimensional (3D) datasets as well as a linear feature in two-dimensional (2D) datasets. Examples of structures are horizons in post-stacked amplitude seismic data and faults, or unconformities in coherence or curvature volumes.

Seismic data often contain both useful structural information and useless random noise. It is desirable to enhance the structures and reduce the random noise. It is commonly known that smoothing is an effective way of reducing random noise. An article by Hall, M., "Smooth Operator: Smoothing Seismic Interpretations and Attributes", The Leading Edge, pp. 16-20, 2007, summarizes eight smoothing methods and discusses their effects. Gaussian and mean filters are structure in-distinguishable and smear the edges and texture boundaries. After these filters are applied, the resolution of horizons, faults, and unconformities are reduced or even lost. Edge-preserving smoothing, such as the known Kuwahara filter, is able to keep edges in 2D, but its 3D counterpart, as described in AlBinHassan, N. M., Luo, Y., and Al-Faraj, M. N., "3D Edge-Preserving Smoothing and Applications", Geophysics, Vol. 71, pp. 5-11, 2006, is designed to preserve body segmentation and cannot keep planar structures, such as faults.

Structure-oriented filtering, as described in Fehmers, G. C. and Hocker, C. F. W., "Fast Structural Interpretation with Structure-Oriented Filtering", Geophysics, Vol. 68, pp. 1286-1293, 2003, solves this problem by computing the structural orientation first, and applies a diffusion scheme along the known orientation. The prior computation of structural orientation and the diffusion algorithm are computational costly, inaccurate for noisy regions, and impossible for non-structured areas which are commonly found in coherence or curvature data.

Another method of filtering known to the prior art is edge-preserving smoothing (EPS), also known as the Kuwahara filter, is described in Luo, Y., Marhoon, M., Al-Dossary, S., and Al-Faraj, M. N., "Edge-Preserving Smoothing and Applications", The Leading Edge, pp. 136-158, 2002; and also in Hall, M., "Smooth Operator: Smoothing Seismic Interpretations and Attributes", The Leading Edge, pp. 16-20, 2007. In the application of EPS, a set of predefined neighborhood sub-windows are used and the best result, which is usually the one with minimum deviation, is selected for smoothed output.

SUMMARY OF THE INVENTION

A data adaptive smoothing method, referred to herein as a structure-preserving smoothing (SPS) method, is provided that does not require prior computation of structural orientation and serves to preserve the structures, if they exist. Compared to structure-oriented filtering, as described in Fehmers, G. C. and Hocker, C. F. W., "Fast Structural Interpretation with Structure-Oriented Filtering", Geophysics, Vol. 68, pp. 1286-1293, and in U.S. Pat. Nos. 6,473,697 and 6,725,174, the method of the invention is faster and more robust because it works for both structured and non-structured areas.

The concept of SPS constitutes an improvement over EPS alone. SPS and EPS work in parallel ways. In EPS, a set of predefined neighborhood sub-windows are used and the best result, which is usually the one with minimum deviation, is selected as smoothed output. In SPS, a set of predefined orientations are used for smoothing, and the best result is selected. If structures exist, such as planar or linear features, the selected result is likely to be the best in alignment with the true structure.

The selection rule of SPS can be a minimum deviation rule, such as is commonly used in EPS. For polar data containing both positive and negative numbers, such as seismic amplitude, the selection rule can also be absolute maximum. For mono-polar data, having only positive numbers, such as coherence or curvatures, the selection rule can be maximum or minimum summation, depending on which end the structure resides.

BRIEF DESCRIPTION OF THE DRAWINGS

Preferred embodiments of the invention are described below and with reference to the drawings, in which.

DETAILED DESCRIPTION

As illustrated in FIGS. 1-9D, a system and method perform structure-preserving smoothing (SPS) on seismic data to generate a smoothed image which retains structures in reservoirs for visual inspection and analysis by a user. The system 10 in FIG. 1 includes a computer 14 accessed by the user 12, a computer-based system 16, and a seismic data source 18 which provides seismic data obtained from a reservoir study to the computer-based system 16. The computer-based system 16 processes the seismic data from the seismic data source 18 to generate an SPS smoothed image 20 which is displayed to the user 12 on a display monitor 22 of the computer 14. The user 12 can control the system 10 and the display of the SPS smoothed image 20 using an input device 24.

Figure 1:
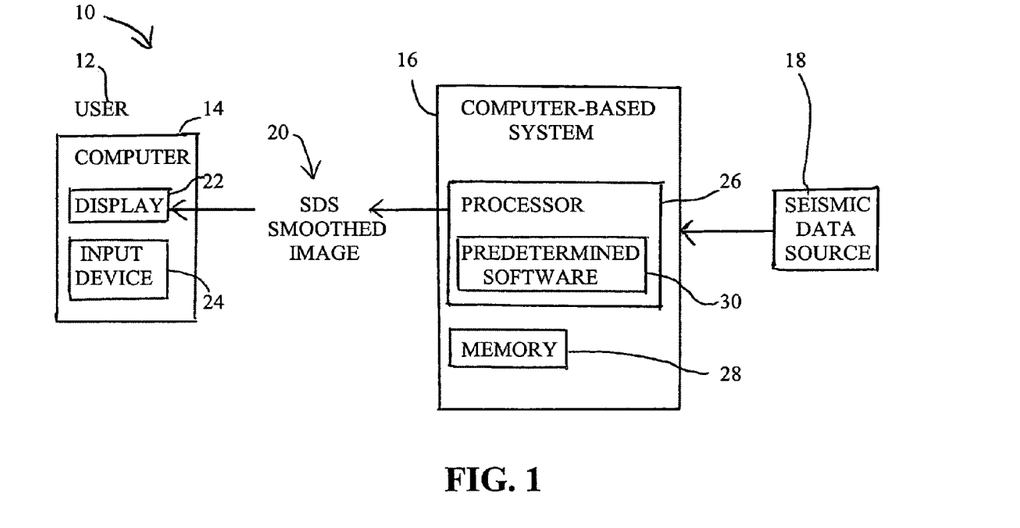
FIG. 1 is a schematic block diagram of the system of the present invention.

The computer-based system 16 includes a processor 26 and a memory 28, where the memory 28 is capable of storing the seismic data from the seismic data source 18. The processor 26 executes predetermined software 30 to implement the SPS method of the invention as described herein to process the seismic data and to generate the SPS smoothed image 20.

Figure 2:
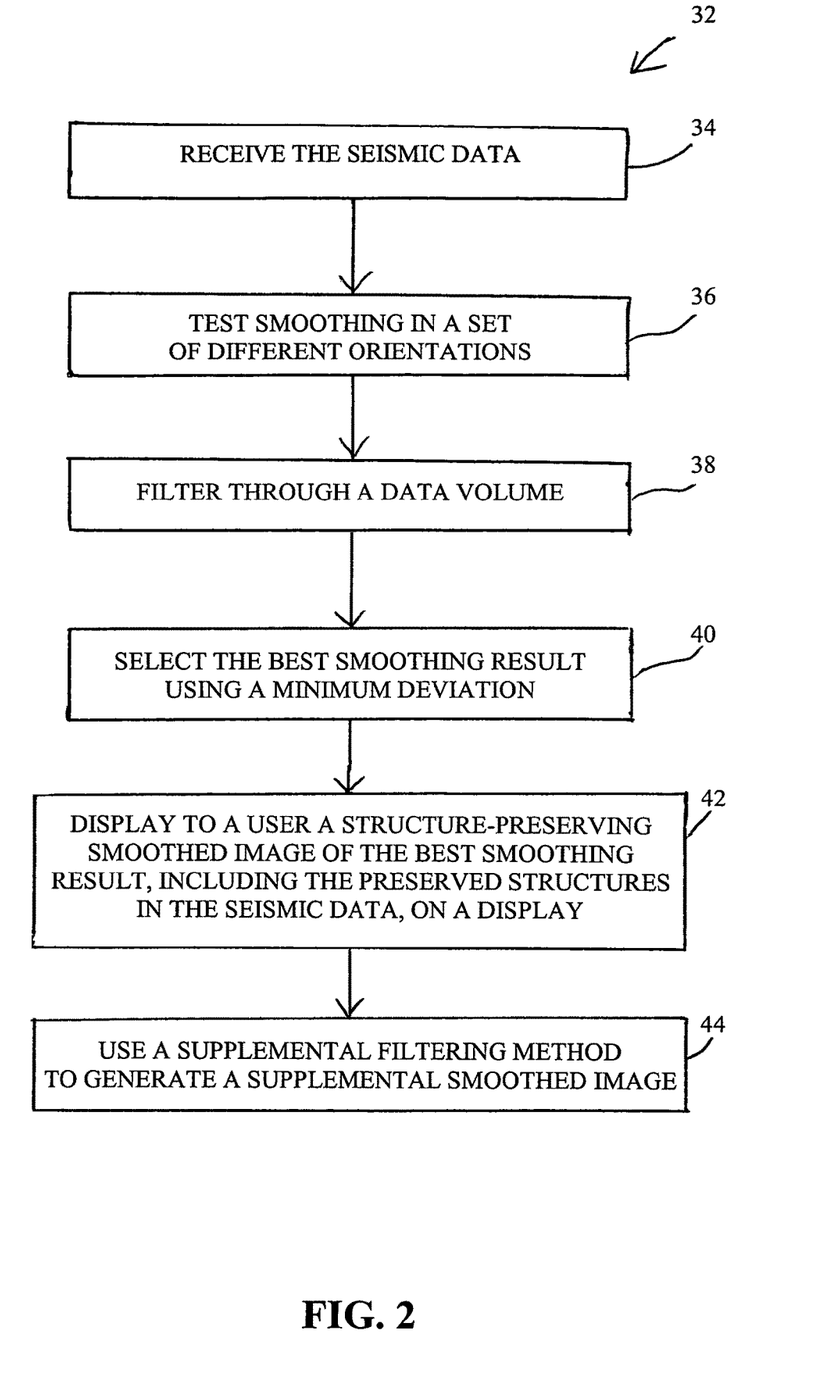
FIG. 2 is a flowchart of operation of the method of the present invention.

As shown in FIG. 2, the disclosed SPS method 32, implemented by the predetermined software 30, includes the steps of receiving the seismic data in step 34, testing the smoothing in a set of different orientations in step 36, filtering through a data volume in step 38, selecting the best smoothing result using a minimum deviation in step 40; and displaying to the user 12 on display device 22 in step 42 a structure-preserving smoothed image of the best smoothing result, which includes the preserved structures in the seismic data.

An optional further step can include using a supplemental filtering method to generate a supplemental smoothed image in step 44. The supplement filtering step can employ the EPS method, a median filter method, symmetric-near-neighbor method, or any 2D smoothing algorithm in order to produce various filtering effects.

In an alternative embodiment, step 40 of selecting the best smoothing result can include using a maximum summation method for coherence data in which interesting structures reside near the high end. Alternatively, step 40 can use an absolute-maximum summation method for seismic amplitudes where positive and negative values are layered over each other.

Referring to FIGS. 3-9B, the operation of the system 10 and method 32 are illustrated in greater detail to show that the essence of the disclosed SPS method of the present invention is to test smoothing in a set of different orientations, and to select the best smoothing result. First, a description is provided as to how the set of orientations are defined.

As disclosed herein, the notation by Bakker, P., "Image Structure Analysis for Seismic Interpretation", PhD Thesis, Universiteit Delft, 2002, for defining orientations and directions is used to distinguish "orientation" from "direction". A direction is 360 degrees rotationally symmetric. If the coordinate system rotates 360 degrees about an axis perpendicular to a specific direction, the direction is unchanged. In contrast to this, an orientation is 180 degrees rotationally symmetric. For example, a flat sheet of paper has two surfaces and two normal directions, but only one orientation.

For simplicity and computational efficiency, a neighborhood sub-window is assumed to be a centered cube with dimensions 3×3×3 or 5×5×5 etc. All data points must be on a regular grid and interpolation should be avoided.

Figure 3A:
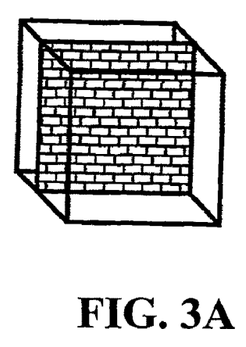
FIGS. 3A-3C illustrate the geometry of a cube and orientation slices thereof.
Figure 3B:
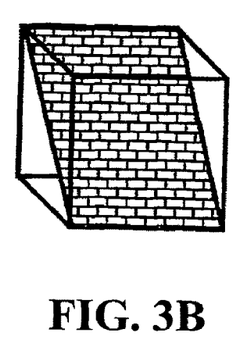
Figure 3C:
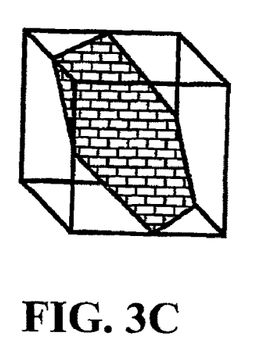

As shown in FIGS. 3A-3B, the geometry of a cube is defined by six sides, with a set of orientation slices defined for the cube. Using an orientation slice between each pair of opposite sides, as shown in FIG. 3A, then there are three slices. Similarly, using orientations midway between opposite edges, as shown in FIG. 3B, there are six slices between twelve edges. Similarly, using orientations midway between the corners, as shown in FIG. 3C, there are four slices between eight corners. For a particular application, a selection of pre-defined orientation slices is defined, and so one may use three orientations between six sides, or nine orientations plus those slices between edges, or all thirteen orientations as in the examples described below: As will be understood by one of ordinary skill in the art, the choice of pre-defined sets is a compromise between accuracy and computational cost.

It is also to be understood that the number of data points on each orientation slice could be different. For instance in a 3×3×3 cube, a slice between edges contains nine points, while a slice between corners has only seven points.

Figure 4:
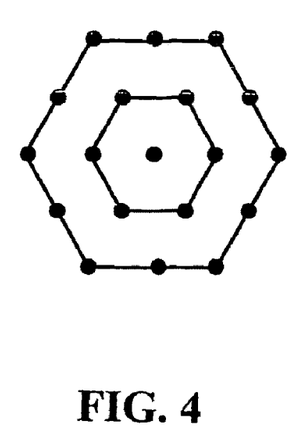
FIG. 4 illustrates a hexagonal slice of a 5×5×5 sub-window of a cube.

As shown in FIG. 4, a hexagonal slice of a 5×5×5 sub-window of a cube, similar to the slice shown in FIG. 3C, has the normal direction that is diagonal in an axis frame, and all data points are on a regular grid for any size of the sub-window, so that corner-facing slices are in a hexagon shape and are not parallel to any axis. Some geometric properties of a hexagon slice are listed in Table 1 for ease of implementation.

TABLE 1

| SUB-WINDOW | RADIUS | NUMBER OF POINTS IN THE OUTER RING | TOTAL NUMBER OF POINTS IN A SLICE |
|---|---|---|---|
| 3 × 3 × 3 | 1 | 6 | 7 |
| 5 × 5 × 5 | 2 | 12 | 19 |
| ... | ... | ... | ... |
| $(2R + 1)^3$ | R | 6R | $1 + 3R(R + 1)$ |

Selection of predefined orientation slices can be adjusted according to applications. For example, coherence and curvature attributes are intended to view dykes and faults. The interesting features are in near-vertical planes; therefore, the horizontal slice should be excluded. To smooth seismic events for easier auto-tracking of horizons, the four vertical slices are not required.

After testing and selecting the set of orientation slices in step 36, filtering through a data volume is performed by the system 10 and method of the present invention in step 38 using known filtering methods. The best smoothing result in step 40 can be selected using the minimum standard deviation. For example, the average value and standard deviation is computed for each of the 13 predetermined directions. The direction with the minimum standard deviation is selected as the best direction to smooth. The minimum standard deviation is determined from the input data, which could be seismic amplitude or any other attribute such as coherence or curvature, which has shown to be a reasonable choice for almost any data type.

In addition, for coherence data in which interesting structures reside near the high end, maximum summation is also appropriate. For seismic amplitude where positive and negative values are layered over each other, absolute-maximum summation can be used. The selection rule can vary depending on particular applications.

After identifying the best orientation within a specified sub-window in step 40, the smoothed image 20 is generated using a known smoothing method applied to the best orientation, with the smoothed image 20 sent to the display 22 for display in step 42. Examples of the smoothed images shown in FIGS. 5B, 6B, 7C, 8C-8D, and 9C-9D are described in more detail below.

In alterative embodiments, further filtering can be performed on the smoothed images 20, by which the SPS method 32 of the present invention can be combined with an EPS method, a median filter method, a symmetric-near-neighbor method, or any 2D smoothing algorithm used in order to produce various filtering effects, as in step 44 in FIG. 2.

APPLICATION EXAMPLES

Preliminary results of using SPS filtering in order to reduce random noise in seismic sections, eliminate noise footprints, and enhance coherence image are described below.

Figure 5A:
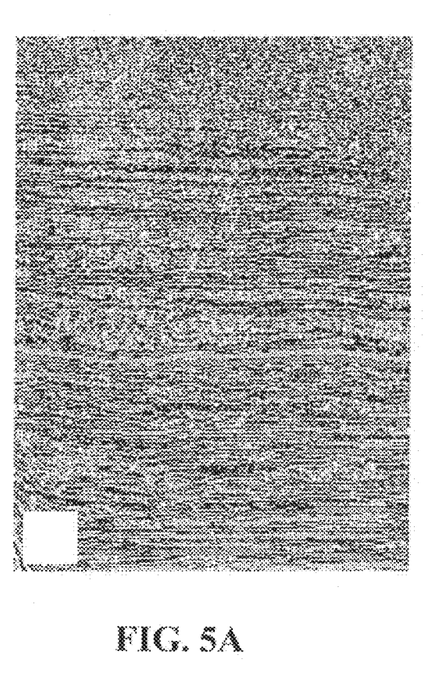
FIGS. 5A-5B illustrate reduction of random noise in a seismic section.
Figure 5B:
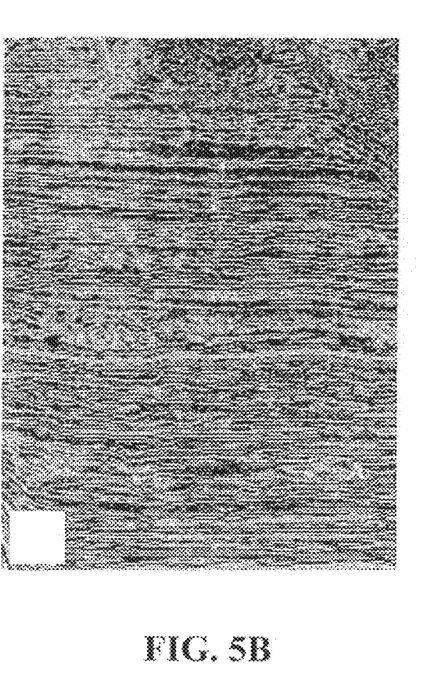

In a first example, a seismic section is displayed in FIG. 5A. After SPS filtering with a 5×5×5 sub-window and minimum deviation rule, as shown in FIG. 5B, the random noise is obviously reduced and horizon continuity is improved. These improvements would aid in interpretation by the user 12 of features and structures, for example, in a reservoir, as well as auto-tracking horizons.

Figure 6A:
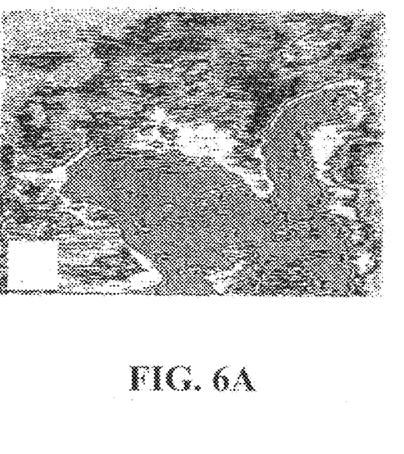
FIGS. 6A-6B illustrate elimination of a patterned noise footprint in a seismic data image.
Figure 6B:
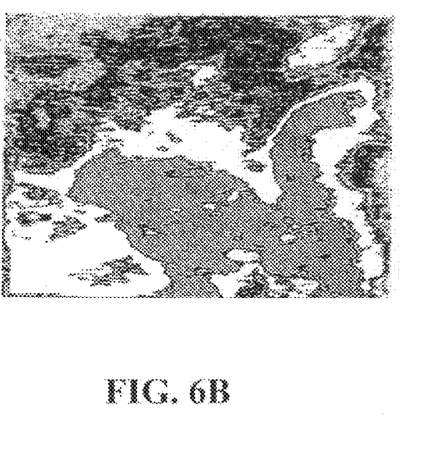

In another example, a footprint may be visible in seismic data images, where the footprint is a patterned noise resulting from acquisition or processing bias. It usually appears in a time slice in seismic amplitude data. FIG. 6A is a seismic time slice in which horizontal stripes are visible. The horizontal direction is sub-line and the vertical direction is cross-line, and the line spacings are 50 m and 25 m respectively. Because the line spacings are unequal, the observed horizontal stripes are likely to be processing artifacts. The SPS method is applied using a 5×5×5 sub-window and a minimum deviation rule. The resultant image, as shown in FIG. 6B, is much cleaner and the footprint is completely removed.

Figure 7A:
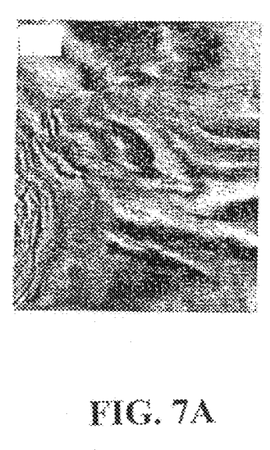
FIGS. 7A-7C illustrate reduction of coherence noise.
Figure 7B:
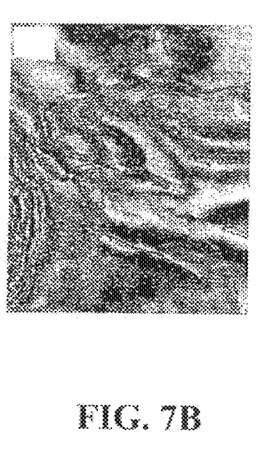
Figure 7C:
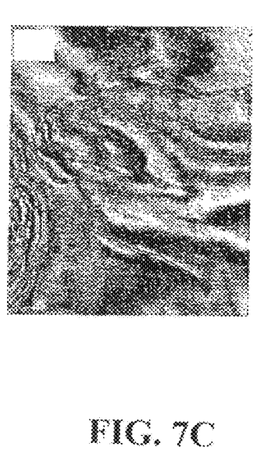

In a further example using 3D data volumes, coherence measures the similarity between neighboring vertical traces, as described in Bahorich, M. S. and Farmer, S. L., "3-D Seismic Discontinuity for Faults and Stratigraphic Features: The Coherence Cube", The Leading Edge, pp. 1053-1058, 1995. This attribute often highlights plane-like features such as dykes, faults, unconformities and fractures. An initial seismic time slice is illustrated in FIG. 7A. After polarization and skeletonization, these features are illustrated in FIG. 7B as lineaments which can be overlaid on seismic data to aid the user in the interpretation of the seismic data. Applying the SPS method to coherence data with application of the maximum summation rule, the resultant skeleton is cleaner, as shown in FIG. 7C, with a reduction of coherence noise.

In another example, the most-negative/positive seismic curvature measures the rate of angular changes of seismic events along a horizontal direction, as described in Al-Dossary, S. and Marfut, K. J., "3D Volumetric Multispectral Estimates of Reflector Curvature and Rotation", Geophysics, Vol. 71, pp. 41-51, 2006. As with coherence data, the curvature attribute also extracts faults and fractures for seismic interpretation. FIGS. 8A-9D show examples of using the SPS system and method of the present invention to clean the curvature attribute and achieve more readily interpretable images.

Figure 8A:
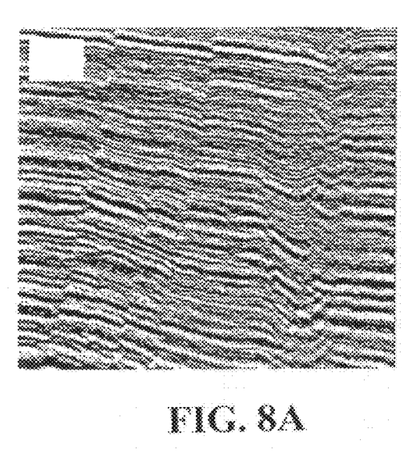
FIGS. 8A-8D illustrate filtering of a seismic section with faults showing a cleaner curvature attribute.
Figure 8B:
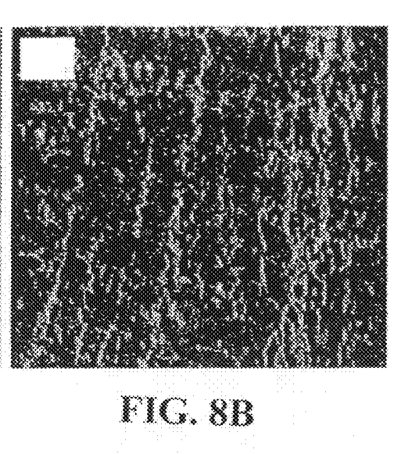
Figure 8C:
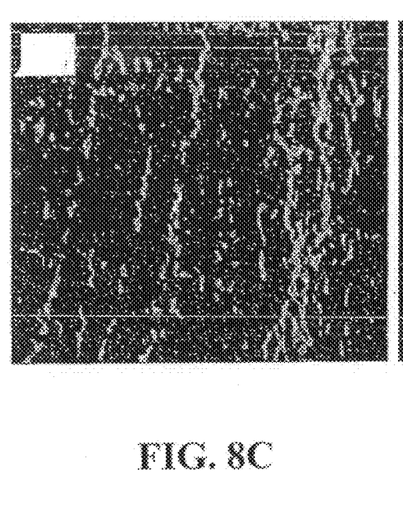
Figure 8D:
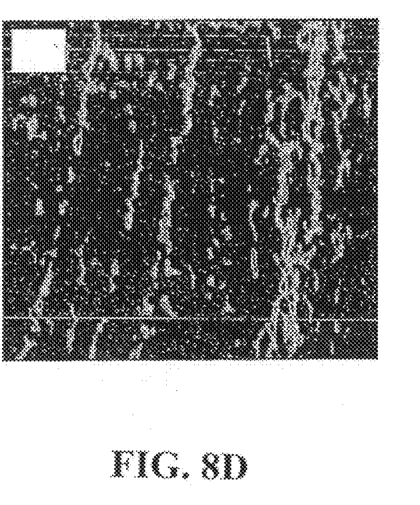

FIG. 8A illustrates a seismic section with faults, and FIG. 8B illustrates the seismic section of FIG. 8A filtered to show the most-positive curvatures. FIG. 8C illustrates the data of FIG. 8B with an SPS filtering using a 3×3×3 sub-window, while FIG. 8D illustrates the data of FIG. 8B with an SPS filtering using a 5×5×5 sub-window; FIGS. 8C-8D show resulting images which are better correlated with faults and that exhibit a cleaner curvature attribute.

Figure 9A:
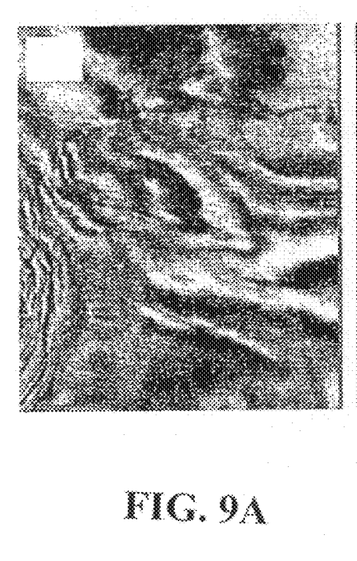
FIGS. 9A-9D illustrate filtering of a seismic section with faults using a time slice and showing a cleaner curvature attribute.
Figure 9B:
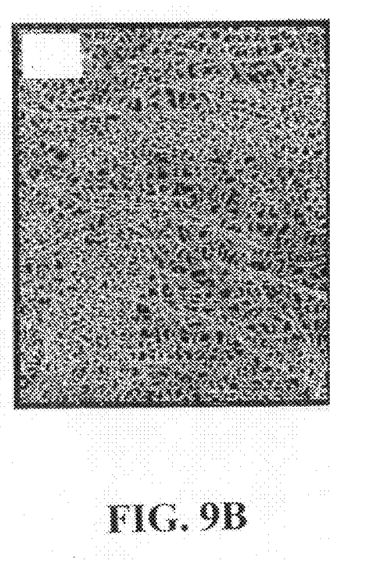
Figure 9C:
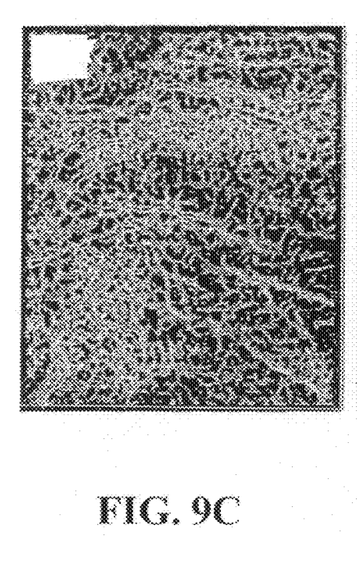
Figure 9D:
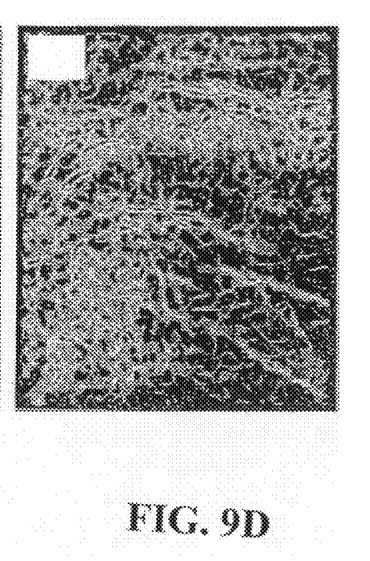

FIGS. 9A-9B illustrate the same seismic section with faults as in FIG. 8A, but viewed in time slice. FIG. 9A illustrates seismic amplitudes and FIG. 9B illustrates the seismic section of FIG. 9A filtered to show the most-positive curvatures. FIG. 9C illustrates the data of FIG. 9B with an SPS filtering using a 3×3×3 sub-window, while FIG. 9D illustrates the data of FIG. 9B with an SPS filtering using a 5×5×5 sub-window; FIGS. 9C-9D show resulting images which are better correlated with faults and exhibit a cleaner curvature attribute.

As demonstrated by the examples of processed seismic image data, the system 10 and method 32 of the present invention for implementing SPS provide a new smoothing apparatus and method for filtering out the random noise in post-stacked seismic attributes. Preliminary tests show that SPS can clear up seismic sections, eliminate footprints, and enhance the coherence image. SPS is simple and robust, and works for both structured and non-structured data. The SPS system 10 and method 32 of the present invention can also be used in broader applications for seismic interpretation, and more generally, in the image processing field.

While the preferred embodiment of the present invention has been shown and described herein, it will be obvious that such embodiment is provided by way of example only. Numerous variations, changes and substitutions will occur to those skilled in the art without departing from the invention herein. Accordingly, it is intended that the invention be limited and defined by the claims that follow.

What is claimed is:

1. A system for smoothing seismic data comprising:
    a processor executing predetermined structure-preserving smoothing (SPS) software to process seismic data wherein the processor:
        generates a plurality of smoothed data for each sub-window of the seismic data by applying smoothing in a predetermined set of different orientations of the seismic data with each orientation being 180 degree rotationally symmetric,
        selects, among the plurality of smoothed data, an optimal smoothed data according to a pre-selected criteria, thereby preserving structures in the seismic data, and
        generates a structure-preserving smoothed image based on the selected optimal smoothed data, including the preserved structures in the seismic data; and
    a display for displaying to a user the structure-preserving smoothed image, including the preserved structures in the seismic data.

2. A method for smoothing seismic data in order to preserve structures present in the data, the method comprising the steps of:
    generating a plurality of smoothed data for each sub-window of the seismic data by applying smoothing in a predetermined set of different orientations of the seismic data, wherein each orientation is 180 degree rotationally symmetric;
    selecting, among the plurality of smoothed data, an optimal smoothed data according to a pre-selected criteria, thereby preserving structures in the seismic data; and
    displaying to a user on a display a structure-preserved smoothed image based on the selected optimal smoothed data, including the preserved structures in the seismic data.

3. The method of claim 2, further comprising the step of:
    using a supplemental filtering method on the selected optimal smoothed data to generate a supplemental smoothed image, wherein the supplemental filter method is selected from an edge-preserving smoothing (EPS) method, a median filter method, a symmetric-near-neighbor method, and a two-dimensional (2D) smoothing algorithm.

4. The method of claim 2, wherein the step of selecting an optimal smoothed data includes using a maximum summation method for coherence data in which structures of interest reside near the high end.

5. The method of claim 2, wherein the step of selecting an optimal smoothed data includes using an absolute-maximum summation method for seismic amplitudes where positive and negative values are layered over each other.

* * * * *